(12) United States Patent
Liang et al.

(10) Patent No.: US 12,445,076 B2
(45) Date of Patent: Oct. 14, 2025

(54) TRACTION INVERTER DC-LINK ACTIVE DISCHARGE METHOD

(71) Applicant: STMicroelectronics International N.V., Geneva (CH)

(72) Inventors: Shisheng Liang, Shanghai (CN); Xiaobo Sun, Shanghai (CN); Jian Wang, Shanghai (CN); Hui Yan, Shanghai (CN)

(73) Assignee: STMicroelectronics International N.V., Geneva (CH)

( * ) Notice: Subject to any disclaimer, the term of this patent is extended or adjusted under 35 U.S.C. 154(b) by 88 days.

(21) Appl. No.: 18/495,594

(22) Filed: Oct. 26, 2023

(65) Prior Publication Data

US 2025/0141386 A1  May 1, 2025

(51) Int. Cl.
*H02P 27/06* (2006.01)
*B60L 3/00* (2019.01)
(Continued)

(52) U.S. Cl.
CPC ............ *H02P 27/06* (2013.01); *B60L 3/0046* (2013.01); *B60L 15/007* (2013.01); *B60L 50/51* (2019.02);
(Continued)

(58) Field of Classification Search
CPC .... B60L 2210/40; B60L 3/0046; B60L 50/51; B60L 15/007; H02M 1/08; H02M 1/088; H02M 1/322; H02M 7/5387; H02P 27/06; H02P 27/08; H02P 27/04; H02P 1/24; H02P 1/26; H02P 6/085; H02P 6/28; H02P 7/29;
(Continued)

(56) References Cited

U.S. PATENT DOCUMENTS

2017/0355267 A1  12/2017  Zhou et al.
2018/0079315 A1  3/2018  Yang et al.
(Continued)

FOREIGN PATENT DOCUMENTS

CN  115296516 A  11/2022

OTHER PUBLICATIONS

Gong, X., Technical White Paper, "Design Priorities in EV Traction Inverter With Optimum Performance," Texas Instruments, 2023, 15 pages.
(Continued)

*Primary Examiner* — Antony M Paul
(74) *Attorney, Agent, or Firm* — Seed Intellectual Property Law Group LLP (57) ABSTRACT

An electronic vehicle includes A DC link capacitor and a traction inverter coupled to the DC link capacitor. The traction inverter includes a first half bridge circuit, a second half bridge circuit, and a third half bridge circuit each coupled between terminals of the DC link capacitor. The traction inverter includes a driver circuit coupled to the traction inverter configured to drive the first, second, and third half bridge circuits to generate an AC voltage in a standard operating mode. The driver circuit is configured to discharge the DC link capacitor responsive to a discharge command by toggling the first half bridge between an open condition and a closed condition while holding the second half bridge circuit and the third half bridge circuit in the open condition.

20 Claims, 10 Drawing Sheets

(51) Int. Cl.
   *B60L 15/00*   (2006.01)
   *B60L 50/51*   (2019.01)
   *H02M 1/088*   (2006.01)

(52) U.S. Cl.
   CPC ......... *H02M 1/088* (2013.01); *B60L 2210/40* (2013.01)

(58) Field of Classification Search
   CPC .. H02P 11/04; H02P 2201/03; H02P 2201/05; H02P 2201/13; H02P 2207/073; H02P 2207/076; H02P 2207/05; H02P 2201/01; H02P 2101/45; H02P 25/32; H02P 21/22
   See application file for complete search history.

(56) References Cited

U.S. PATENT DOCUMENTS

| | | | |
|---|---|---|---|
| 2020/0067400 A1* | 2/2020 | Li | H02M 1/4216 |
| 2022/0097632 A1 | 3/2022 | D'Angelo et al. | |

OTHER PUBLICATIONS

Pan et al., "A Novel Discharging Control Strategy for Modular Multilevel Converter Submodules without Using External Circuit," IEEE, 2018, pp. 656-661.

* cited by examiner

TRACTION INVERTER DC-LINK ACTIVE DISCHARGE METHOD

BACKGROUND

Technical Field

The present disclosure relates to traction inverters, and more particularly to traction inverters implementing SiC transistors.

Description of the Related Art

Traction inverters are commonly utilized in electronic vehicles. In particular, a traction inverter may be utilized to convert a DC voltage from a battery to an AC voltage that may be utilized to drive a motor of the electronic vehicle. In order to maintain a steady voltage at the DC input of the traction inverter, a DC link capacitor may be implemented. The DC link capacitor is coupled across the DC inputs of the traction inverter.

In many cases, the battery voltage is quite high. For example, the battery voltage may be more than 500 V. When the traction inverter is operating, the DC link capacitor may be charged to more than 500 V. While this is beneficial for operation of the traction inverter, there can also be risks associated with such a highly charged capacitor.

Accordingly, there are circumstances in which it is beneficial to discharge the DC link capacitor. For example, if the electric vehicle is in an accident or otherwise has a collision, if maintenance is being performed, or in other circumstances, it is beneficial to discharge the capacitor to avoid danger to humans or to the electronic vehicle itself.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

Embodiments of the present disclosure enable the rapid discharging of a DC link capacitor of a traction inverter in the event that such discharge is called for. The traction inverter includes an inverter stage including a plurality of half bridge circuits coupled between a high DC voltage rail and a low DC voltage rail and between terminals of the DC link capacitor. When a discharge command is received at the traction inverter, embodiments of the present disclosure control the half bridge circuits so that all but one of the half bridge circuits are held in an open condition while the remaining half bridge circuit is carefully toggled between an open condition and a closed condition. During the closed condition, a discharge current flows between the terminals of the DC link capacitor through the selected half bridge circuit. The toggling continues until the DC link capacitor has been discharged to a preselected voltage.

In one embodiment, the inverter stage includes three half bridge circuits. Each half bridge circuit includes a pair of power transistors. The power transistors can include silicon carbide power transistors, insulated gate bipolar transistors (IGBTs) or other types of transistors. A driver circuit drives the gate terminals of the power transistors. When the driver circuit receives a command to discharge the DC link capacitor, the driver circuit holds two of the pairs of the power transistors in an open condition including keeping a first power transistor of the pair in an on state and a second power transistor of the pair in an off state. For the third pair of power transistors, the driver circuit keeps a second power transistor in an on state while toggling a first power transistor between an off state and an on state. The DC link capacitor discharges when the first and second power transistors of the third pair are both in an on state.

In one embodiment, the driver circuit monitors the gate voltage of the power transistor that is toggled during discharge. During toggling, the gate driver charges the gate terminal of the toggled transistor beyond the threshold voltage of the toggled transistor. As the gate voltage crosses the threshold voltage, the toggled transistor begins to conduct the discharge current. When the gate voltage reaches a selected voltage level, the driver circuit reduces the gate voltage to ground until the next toggling cycle begins. Accordingly, the discharge current briefly flows and then stops flowing. The careful monitoring and controlling of the gate voltage ensures that the discharge current is never high enough or long enough to damage the toggled power transistor.

In one embodiment, a method includes generating an AC voltage with a traction inverter including a first half bridge circuit, a second half bridge circuit, and a third half bridge circuit each coupled between terminals of a DC link capacitor. The method includes receiving, at a driver circuit coupled to the first, second, and third half bridge circuits, a command to discharge the DC link capacitor. The method includes discharging the DC link capacitor responsive to the command by toggling, with the driver circuit, the first half bridge between an open condition and a closed condition while holding the second half bridge circuit and the third half bridge circuit in the open condition.

In one embodiment, a method includes generating an AC voltage with a traction inverter. The traction inverter includes a first power transistor and a second power transistor coupled together as first half bridge circuit between a first terminal and a second terminal of a DC link capacitor, a third power transistor and a fourth power transistor coupled together as second half bridge circuit between the first terminal and the second terminal of the DC link capacitor, and a fifth power transistor and a sixth power transistor coupled together as a third half bridge circuit between the first terminal and the second terminal of the DC link capacitor. The method includes discharging the DC link capacitor responsive to a discharge command by toggling the first power transistor between an on state and an off state while holding the second, fourth and sixth transistors in the on state and the third and fifth transistors in the off state.

In one embodiment, a device includes a DC link capacitor and a traction inverter including a first half bridge circuit, a second half bridge circuit, and a third half bridge circuit each coupled between terminals of the DC link capacitor. The device includes a driver circuit coupled to the traction inverter. The driver circuit is configured to drive the first, second, and third half bridge circuits to generate an AC voltage and to discharge the DC link capacitor responsive to a discharge command by toggling the first half bridge between an open condition and a closed condition while holding the second half bridge circuit and the third half bridge circuit in the open condition.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known systems, components, and circuitry associated with integrated circuits have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Figure 1:
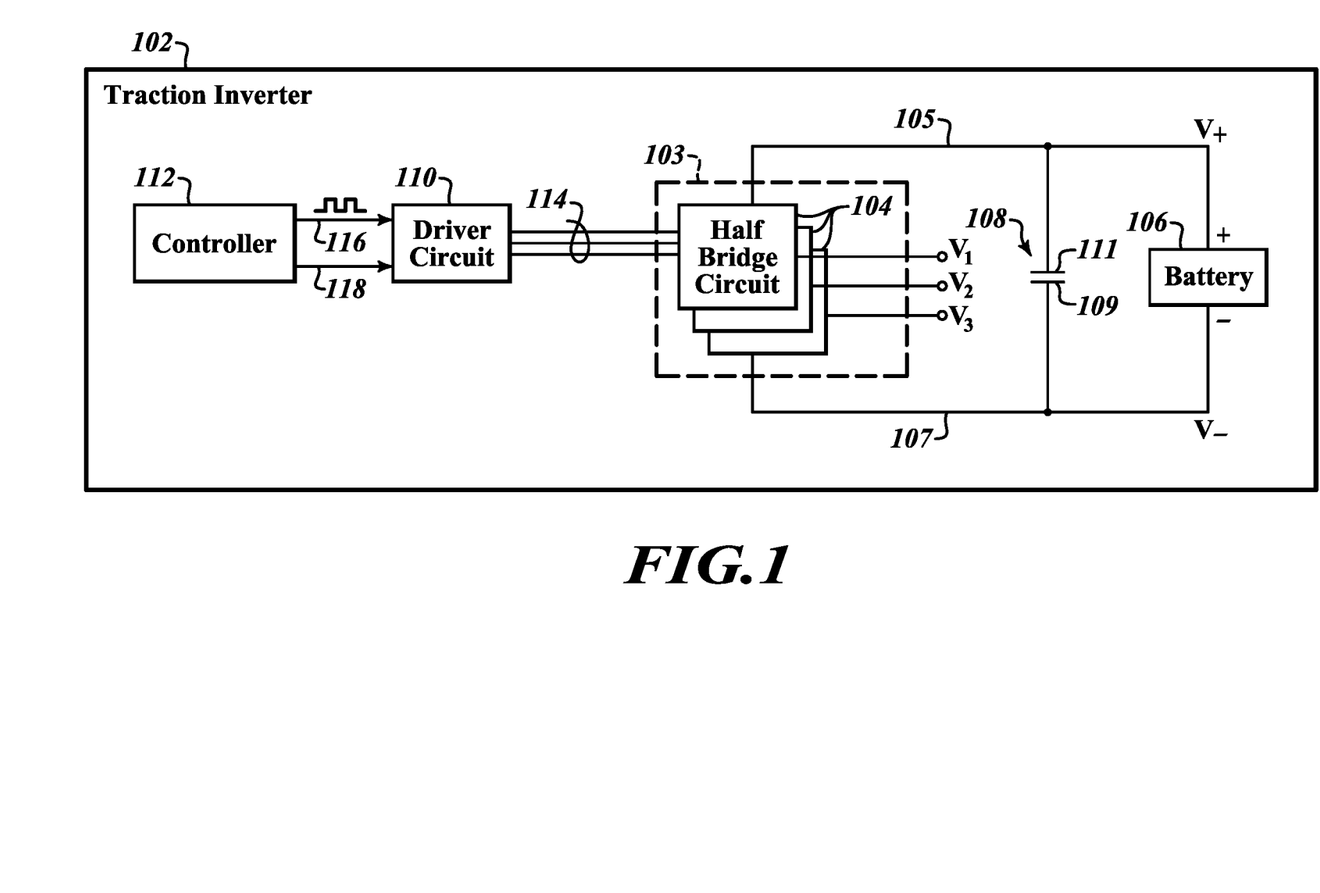
FIG. 1 is a block diagram of a traction inverter, in accordance with one embodiment.

FIG. 1 is a block diagram of a traction inverter 102, in accordance with one embodiment. The traction inverter includes an inverter stage 103 and a DC link capacitor 108. As will be set forth in more detail below, the components of the traction inverter 102 cooperate to utilize the inverter stage 103 to rapidly and safely discharge the DC link capacitor 108.

During operation, the traction inverter 102 receives a DC voltage from a battery 106 across a high voltage rail 105 and a low voltage rail 107. The traction inverter 102 utilizes the inverter stage 103 to convert the DC voltage to an AC voltage.

FIG. 1 illustrates the battery 106 as part of the traction inverter 102. However, in practice, the battery 106 may be external to the traction inverter 102. The battery 106 may provide a voltage between 100 V and 800 V between the high voltage rail 105 and the low-voltage rail 107. Other voltages can be utilized without departing from the scope of the present disclosure.

The traction inverter 102 includes a DC link capacitor 108 coupled between the high voltage rail 105 and the low-voltage rail 107. In particular, the DC link capacitor 108 includes a terminal 111 coupled to the high voltage rail 105 and a terminal 109 coupled to the low-voltage rail 107. The DC link capacitor can be utilized to stabilize the voltage between the high voltage rail 105 and the low-voltage rail 107. For example, if there are fluctuations in the battery voltage, or after other transient current or voltage fluctuations, the presence of the DC capacitor 108 can help ensure a relatively stable voltage between the high voltage rail 105 and the low-voltage rail 107.

The DC link capacitor 108 may have a very high capacitance. For example, the DC link capacitor may have a capacitance between 1 mF and 100 µF, though other capacitances can be utilized without departing from the present disclosure. Accordingly, when the DC link capacitor 108 is fully charged to the high voltage level of the battery 106, the DC link capacitor 108 stores a very large amount of charge.

When the DC link capacitor 108 is fully charged, it could be harmful if a human were to accidentally contact the terminals of the DC link capacitor 108. It can also be very harmful if a conductive component were to inadvertently contact the terminals of the DC link capacitor 108. Furthermore, a fire or explosion adjacent to a fully charged DC link capacitor 108 could result in damage to surrounding components or individuals. As will be set forth in more detail below, the components of the traction inverter 102 cooperate to rapidly discharge the DC link capacitor 108 and selected circumstances. Prior to describing the discharge process for the DC link capacitor 108, it is beneficial to describe other functions and components of the traction inverter 102.

The inverter stage 103 includes a plurality of half bridge circuits 104. Each half bridge circuit 104 is coupled between the high voltage rail 105 and the low-voltage rail 107. Accordingly, each half bridge circuit 104 receives the DC voltage of the battery 106. Each half bridge circuit 104 outputs an AC voltage. In the example of FIG. 1, there are three half bridge circuits 104 respectively outputting AC voltages v1, v2, and v3. The AC voltages v1, v2, and v3 collectively correspond to a three-phase AC voltage.

The traction inverter 102 includes a driver circuit 110. The driver circuit 110 is coupled to the half bridge circuits 104 by signal lines 114. The driver circuit 110 drives each of the half bridge circuits 104 via the signal lines 114. Or particularly, as will be set forth in more detail below, the driver circuit 110 drives the gate voltages of the power transistors that make up each of the half bridge circuits 104. Accordingly, during standard operation of the traction inverter 102, the driver circuit 110 drives the gate terminals of the power transistors of the half bridge circuits 104 to turn on and off in a selected manner to provide the AC voltages v1, v2, and v3.

The traction inverter 102 includes a controller 112 coupled to the driver circuit 110. The controller 112 can correspond to a microcontroller, a microprocessor, or other types of control circuits. The controller 112 provides drive signals 116 to the driver circuit 110. The drive signals can correspond to the waveforms or patterns by which the driver circuit 110 is to drive the gate terminals of each of the power transistors of the half bridge circuits 104. During standard operation of the traction inverter 102, the controller 112 may provide drive signals 116 corresponding to square waves with various relative phases to drive the gate terminals of the power transistors of the half bridge circuit 104 to provide the three-phase AC voltage.

The controller 112 also provides a discharge command 118 to the driver circuit 110. The controller 112 can determine that an event has occurred that makes it beneficial to stop the standard operation of the traction inverter 102 (generation of the AC voltage) and to rapidly discharge the DC link capacitor 108. In this case, the controller 112 outputs a discharge command 118 to the driver circuit 110. The discharge command 118 causes the driver circuit 110 to cease driving the inverter stage 103 to generate the AC voltage and to cause the inverter stage 103 to rapidly and safely discharge the DC link capacitor 108.

The controller 112 may issue the discharge command 118 responsive to occurrence of a particular event. For example, the temperature of the traction inverter 102 or of a component of the traction inverter 102 may become too high. A vehicle of which the traction inverter 102 is part may be in an accident or otherwise have a collision. Or other potentially hazardous events may occur. Sensors or other control circuits may provide signals to the controller 112 indicative of the hazardous condition. The controller 112 may then issue the discharge command 118 in response to the hazardous condition.

In one embodiment, when the driver circuit 110 receives the discharge command 118 from the controller 112, the driver circuit stops driving the inverter stage 103 to generate the AC voltage. The driver circuit 110 enters a discharge mode in order to safely and rapidly discharge the capacitor 108.

In one embodiment, during the discharge mode, the driver circuit 110 holds two of the half bridge circuits 104 in an open condition. As used herein, the phrase "open condition" or "open state" of a half bridge circuit corresponds to a state in which the half bridge circuit 104 does not conduct a current between the terminal 109 and the terminal 111 of the DC link capacitor 108. As used herein, the phrase "closed condition" or "closed state" corresponds to a state in which the half bridge circuit 104 conducts a discharge current between the terminals 111 and 109 of the DC link capacitor 108. Accordingly, during the discharge mode two of the half bridge circuits 108 are controlled to not conduct a discharge current.

During the discharge mode, the driver circuit 110 controls the remaining half bridge circuit 104 to rapidly toggle between an open condition in the closed condition in order to discharge the DC link capacitor 108. During the periods of the closed condition, a discharge current flows between the terminals 111 and 109 of the DC link capacitor 108 through the remaining half bridge circuit 104. The half bridge circuit 104 that is toggled during the discharge mode may be termed a "selected half bridge circuit".

In one embodiment, each half bridge circuit includes a pair of power transistors coupled as a half bridge circuit 104 between the rails 105 and 107. For the two half bridge circuits 104 that are held in the open condition, one of the power transistors may be held on while the other power transistor is held off. For the selected half bridge circuit, one of the power transistors is held on while the other power transistor is toggled on and off. The power transistor that is toggled on and off during the discharge mode may be termed a "selected power transistor".

In one embodiment, the selected power transistor is carefully monitored and controlled so that the discharge current is not high enough and does not last long enough to damage the power transistors of the selected half bridge circuit 104. The driver circuit 110 may receive a square wave signal from the controller 110 to drive the toggling of the selected power transistor. At the rising edge of the square wave, the driver circuit 110 may begin charging the gate terminal of the selected power transistor at a selected slew rate. When the gate to source voltage of the selected power transistor crosses the threshold voltage of the power transistor, a discharge current is conducted through the power transistors of the selected half bridge circuit 104.

The driver circuit 110 continues to charge the gate to source voltage beyond the threshold voltage of the selected power transistor. The driver circuit 110 monitors the gate to source voltage and compares the gate to source voltage to a selected threshold value. When the gate to source voltage of the selected power transistor reaches the selected threshold value, the driver circuit 110 stops charging the gate terminal and brings the gate to source voltage to ground. This stops conduction of the discharge current. Upon receiving the next rising edge of the square wave signal, the driver circuit 110 again begins charging the gate to source voltage of the selected power transistor. This continues through a large number of cycles until the voltage across the terminals 111 and 109 of the DC link capacitor 108 crosses below a selected discharge voltage. In some embodiments, the driver circuit 110 may bring the gate to source voltage to a negative voltage rather than to ground.

The use of the selected threshold value to trigger turning off the selected power transistor helps ensure that the selected power transistor is not damaged. In particular, the magnitude and duration of the discharge current is kept at a level that rapidly discharges the capacitor 108 that does not damage the power transistors of the selected half bridge circuit 104. The result is safe and effective discharge of the DC link capacitor 108.

In one embodiment, safety standards may call for discharge of the DC link capacitor 108 from a high voltage to less than 60 V within a period of time less than three seconds a response to detection of a hazardous condition. The driver circuit 110 operating in the discharge mode is able to safely and successfully meet such a specification. Other standards for discharge can be utilized without departing from the scope of the present disclosure.

Figure 2:
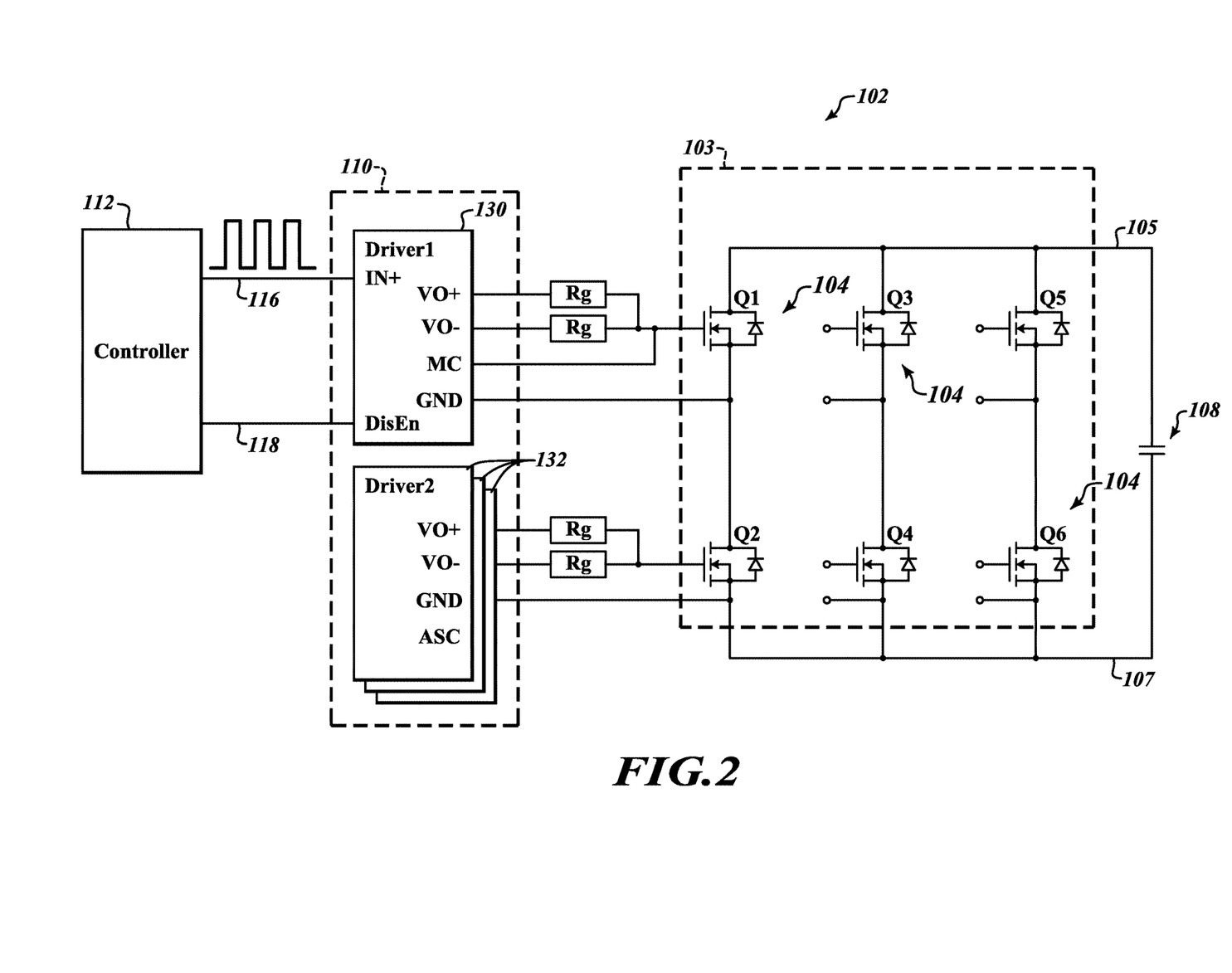
FIG. 2 is a schematic diagram of a traction inverter, in accordance with one embodiment.

FIG. 2 is a schematic diagram of a traction inverter 102, in accordance with one embodiment. The traction inverter 102 of FIG. 2 is one example of a traction inverter 102 of FIG. 1. FIG. 2 illustrates the DC link capacitor coupled between the high voltage rail 105 and the low-voltage rail 107. FIG. 2 does not illustrate the battery 106, though the battery 106 is also coupled between the high voltage rail 105 and the low-voltage rail 107.

In one embodiment, the inverter stage 103 corresponds to a silicon carbide module. The inverter stage 103 includes three half bridge circuits 104 each coupled between the high voltage rail 105 and the low-voltage rail 107. The first half bridge circuit 104 includes a first power transistor Q1 and a second power transistor Q2 coupled together between the high voltage rail 105 and the low-voltage rail 107. The second half bridge circuit 104 includes a third power transistor Q3 and the fourth power transistor Q4 coupled between the high voltage rail 105 and the low-voltage rail 107. The third happened circuit 104 includes a fifth power transistor Q5 and a sixth power transistor Q6 coupled between the high voltage rail 105 and the low-voltage rail 107. Modulation of the gate terminals of the transistors Q1-Q6 results in the generation of a three phase AC voltage during standard operation of the inverter stage 103.

In one embodiment, a driver circuit 110 is coupled to the inverter stage 103. In FIG. 2, the driver circuit 110 includes a first driver stage 130 that drives the selected transistor Q1. The driver circuit 110 includes a plurality of driver stages 132 that each drive a respective one of the power transistors Q2-Q6. Particular focus is given to the driver stage 130 because the driver stage 130 performs the complex driving of the selected transistor Q1 during the discharge mode.

Each of the driver stages 130/132 is coupled to the controller 112. Each of the driver stages 130/132 receives driver signals 116 at a terminal IN+. Each of the driver stages 130/132 drives the corresponding power transistor in accordance with the driver signal 116 during standard operation. Each of the driver stages 130/132 includes a terminal DisEn that receives the discharge command 118 from the controller 112. Each of the driver stages includes a high output terminal VO+ and a low output terminal VO− coupled to the gate terminal of the corresponding power transistor Q1 by a resistor Rg. The driver circuit 130 also includes a terminal MC that monitors the gate voltage of the transistor Q1 during the discharge mode, as will be described in more detail below.

During standard operation of the traction inverter 102, the driver stages 130/132 modulate each of the transistors Q1-Q6 in accordance with the driver signals 116 via the terminals VO+ and VO− in order to generate the three-phase AC voltage. During the standard operation, the discharge command is at a low value indicating that the DC link capacitor 108 is not to be discharged.

When the controller 112 determines that the DC link capacitor 108 is to be discharged, the discharge command goes high. Each of the driver stages 130/132 receives the discharge command. In response to the discharge command, the driver stages 132 hold the transistors Q2-Q6 in a selected steady-state. In particular, the transistors Q2, Q4, and Q6 are held in the on state. The transistors Q3 and Q5 are held in the off state.

During the discharge mode, the driver stage 130 toggles the transistor Q1 between an on state and an off state in accordance with the driver signal 116 and other circuit configurations. When discharge begins, VO+ is kept in the HiZ state because DisEn=1, the gate of T1 is high so T1 is off as T1 is a PMOS transistor. The gate terminal of Q1 begins to charge via the terminal MC, which is coupled to a current source 142 via the switch S1. The driver stage 130 also monitors the voltage of the gate terminal of the transistor Q1 via the terminal MC. When the voltage of the gate terminal reaches the high threshold value as detected at the terminal MC, the driver stage 130 discharges the gate terminal by asserting VO−. The toggling continues until the capacitor 108 is discharged.

Figure 3:
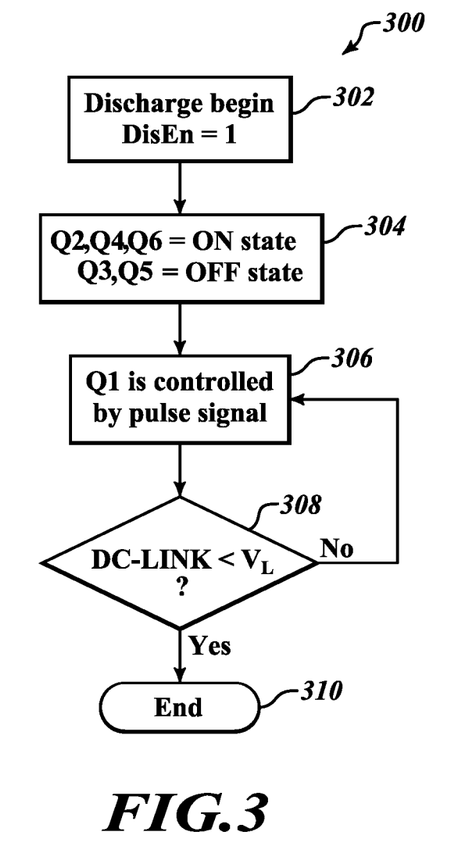
FIG. 3 is a flow diagram of a method for operating the traction inverter of FIG. 2, in accordance with one embodiment.

FIG. 3 is a flow diagram of a method 300 for operating the traction inverter 102 of FIG. 2 during the discharge mode, in accordance with one embodiment. At 302, the discharge mode is engaged when the discharge command received at the discharge terminal DisEn of the driver stages 130/132 goes high or has a logic value of 1. At 304, the transistors Q2, Q4, and Q6 are held in the on state. The transistors Q3 and Q5 are held in the off state. At 306, the transistor Q1 is controlled by a pulse signal (driver signal 116) and is toggled on and off. At 308, the controller 112 determines whether or not the voltage of the DC link capacitor 108 is less than a low threshold value VL. If the voltage of the DC link capacitor 108 is not less than the low threshold value VL, then toggling of the transistor Q1 continues at 306. If the voltage of the DC link capacitor 108 is less than the low threshold value VL, then the discharge process ends at 310.

Figure 4:
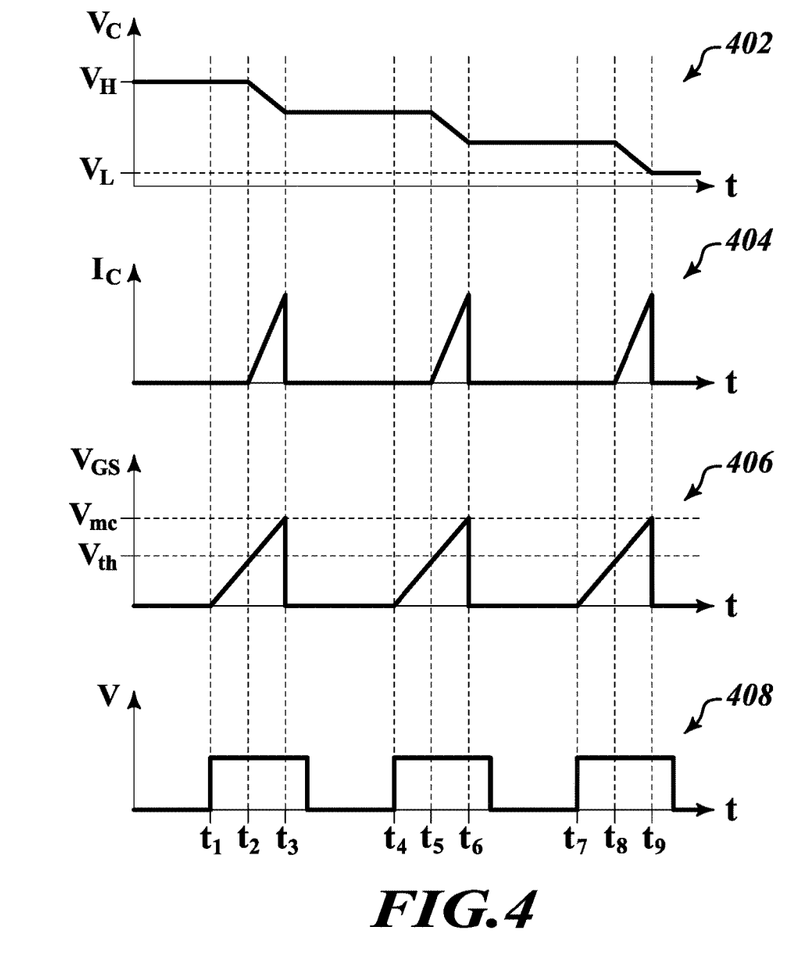
FIG. 4 includes a plurality of graphs associated with discharging a DC link capacitor of a traction inverter, in accordance with one embodiment.

FIG. 4 illustrates a plurality of graphs associated with the discharge mode of FIGS. 2 and 3 while the discharge command is high, in accordance with one embodiment. The graph 402 illustrates to the voltage VC on the DC link capacitor 108. The graph 404 corresponds to the discharge current IC passing through the selected half bridge circuit 104 during the discharge mode. The graph 406 illustrates the gate to source voltage of the power transistor Q1 during the discharge mode. The graph 408 illustrates the driver signal 116 that is supplied to the driver stage 130 during the discharge mode.

At time t1, the voltage of the capacitor is at a high level VH. At time t1, the driver signal goes high and the gate to source voltage VDS begins to charge. At time t2, the gate to source voltage VGS process the threshold voltage Vth of the transistor Q1 and the discharge current IC begins to flow through the transistors Q1 and Q2 which are both in the on state. At time t3 the gate to source voltage VDS reaches the threshold value VMC, causing the driver stage 130 to bring the gate to source voltage back to ground (or another low value). The discharge current IC drops off. The voltage on the DC link capacitor 108 has dropped due to the flow of the discharge current.

At time t4, a next rising edge of the driver signal 116 is received in the process described in relation to times t1-t3 is repeated between times t4-t6. In particular, the gate terminal of charged, the discharge current IC begins to flow, the gate terminal reaches the threshold value VMC and is discharged, and the discharge current IC stops flowing. The voltage VC of the DC link capacitor 108 again drops due to the discharge current.

At time t7, a next rising edge of the driver signal 116 is received and the process described in relation to times t1-t3 is repeated between times t7-t9. In particular, the gate terminal of charged, the discharge current IC begins to flow, the gate terminal reaches the threshold value VMC and is discharged, and the discharge current IC stops flowing. The voltage VC of the DC link capacitor 108 again drops due to the discharge current. In this case, the voltage VC has dropped to the low value VL and the discharge mode is exited.

Figure 5:
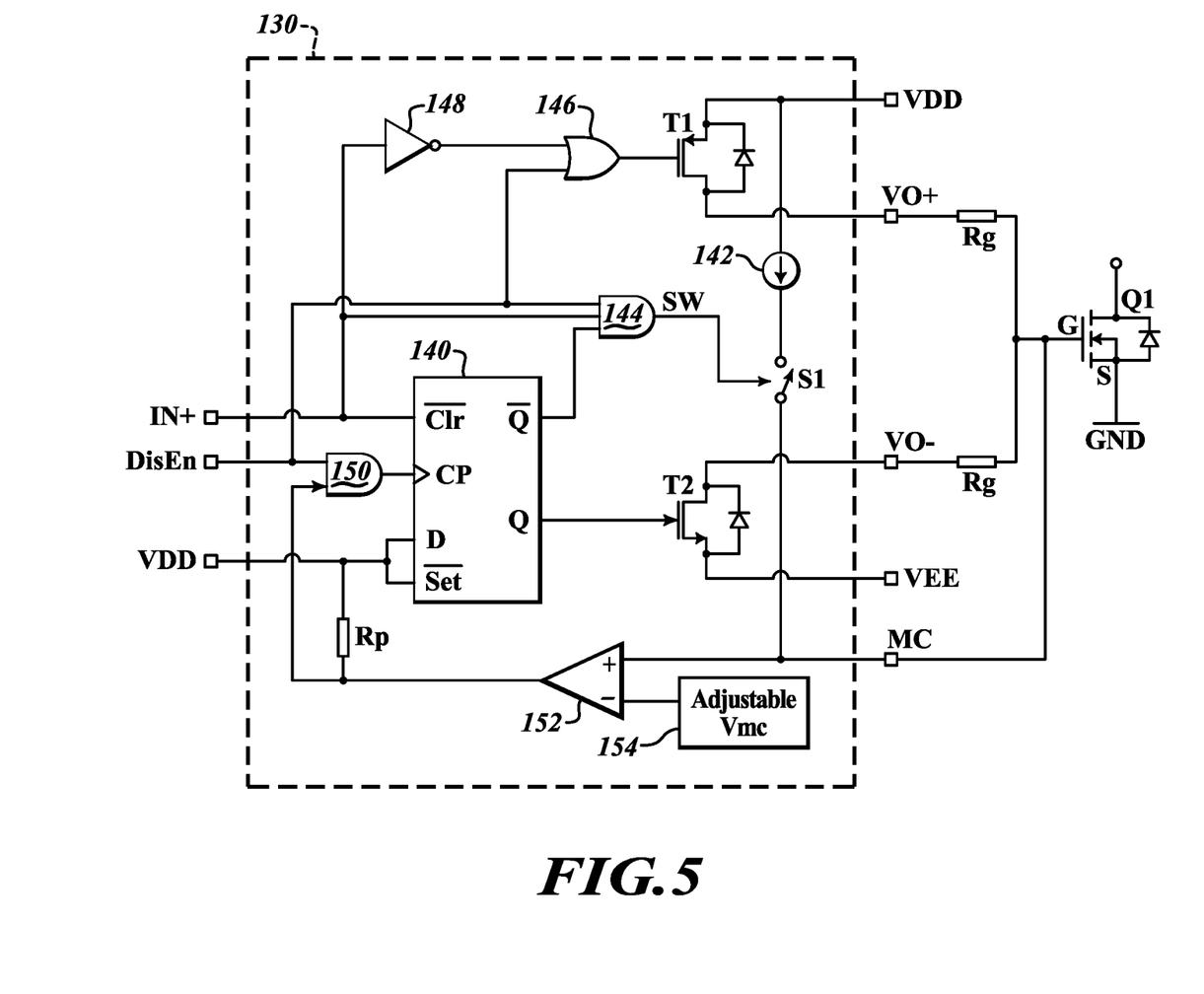
FIG. 5 is a schematic diagram of a portion of a driver circuit of a traction inverter, in accordance with one embodiment.

FIG. 5 is a schematic diagram of the driver stage 130 of FIG. 2, in accordance with one embodiment. FIG. 5 also illustrates the transistor Q1. The driver stage 130 includes a terminal that receives the supply voltage VDD, the terminal VO+ coupled to the gate terminal of the transistor Q1 via a resistor Rg, the terminal VO− coupled to the gate terminal of the transistor Q1 via a resistor Rg, a supply terminal that receives the supply voltage VEE (e.g., ground), a terminal is MC coupled to the gate terminal of the transistor Q1, the terminal IN+ that receives the driver signal 116 from the controller 112, and the terminal DisEn that receives the discharge command 118 from the controller 112.

The driver stage 130 includes a transistor T1 having a source terminal coupled to the supply terminal VDD and a drain terminal coupled to the terminal VO+. The driver stage 130 includes a nor gate 146 having an output coupled to the gate of the transistor T1, an input coupled to the output of an inverter 148, and an input coupled to DisEn. The input of the inverter 148 is coupled to IN+. The driver stage includes a circuit 140 having terminals Clrbar, CP, D, Setbar, Qbar and Q. An AND gate 150 has a first input terminal coupled to DisEN and a second input terminal coupled to the output of the comparator 150. The output of the AND gate is coupled to CP. An AND gate 144 has a first terminal coupled to DisEn, a second terminal coupled to IN+, and a third input terminal coupled to Qbar. The output of the AND gate 144 is SW controls a switch S1. A current source 142 is coupled between VDD and the switch S1. A transistor T2 has a drain terminal coupled to VO−, a gate terminal coupled to Q, and a source terminal coupled to VEE. A noninverting input of the comparator 152 is coupled to MC and receives the gate voltage of the transistor Q1. The inverting input of the comparator 152 is coupled to an adjustable voltage generator 154 that provides the threshold value Vmc. A resistor Rp is coupled between the output of the comparator 152 and the terminals D and Setbar, which receive VDD.

Figure 6:
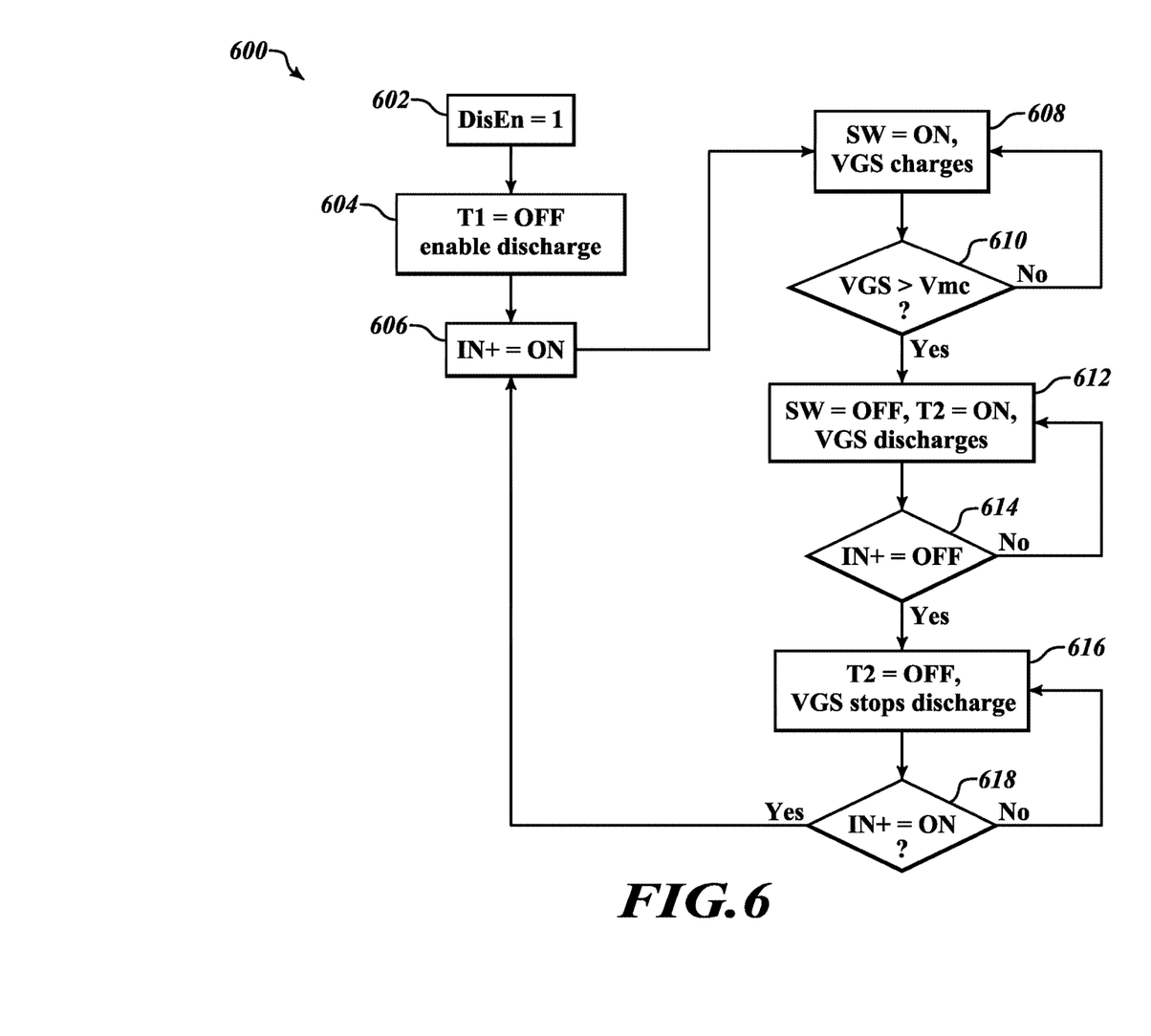
FIG. 6 is a flow diagram of a method for operating the driver circuit of FIG. 5, in accordance with one embodiment.
Figure 7:
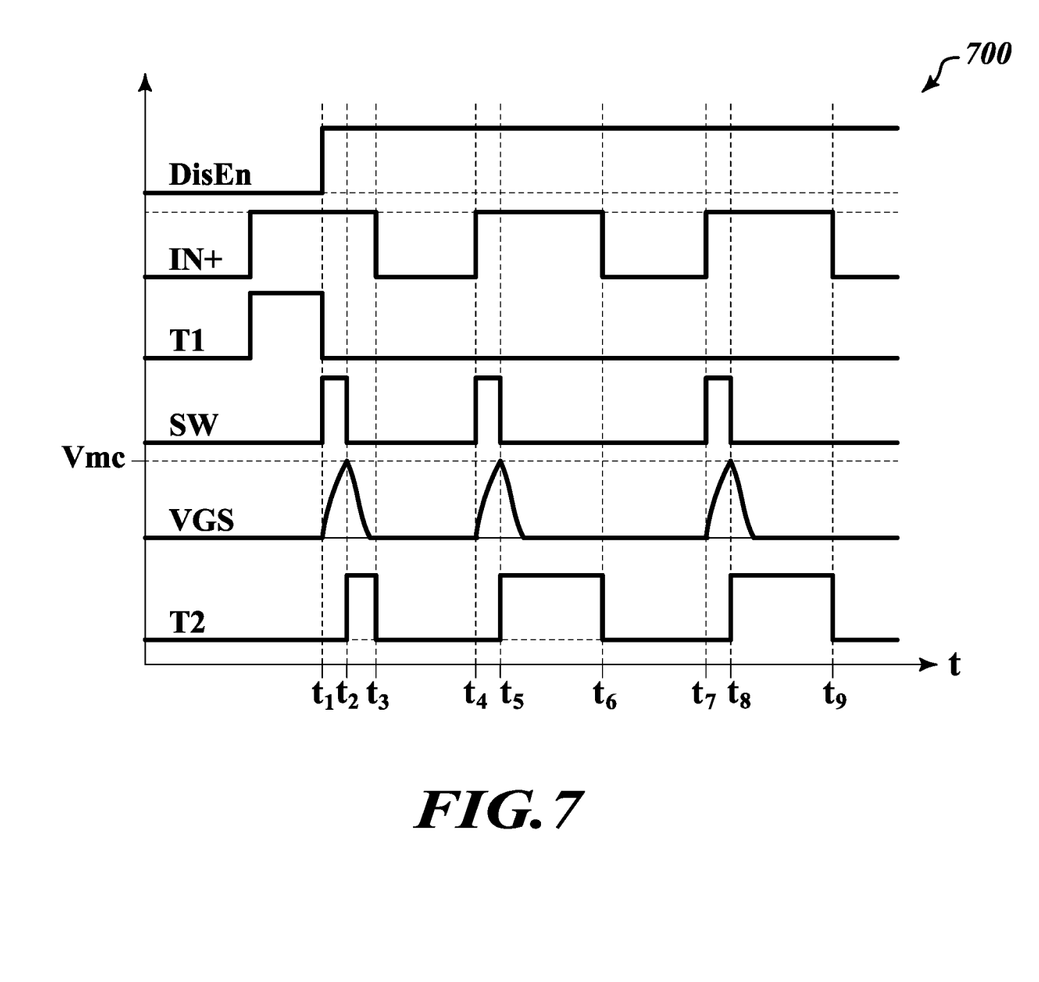
FIG. 7 includes a plurality of graphs associated with discharging a DC link capacitor of a traction inverter, in accordance with one embodiment.

The function of the driver stage 130 can be understood in relation to FIGS. 6 and 7. FIG. 6 is a flow diagram of a method 600 for operating the driver stage 130, in accordance with one embodiment. FIG. 7 is a graph 700 illustrating signals associated with the function of the driver stage 130, in accordance with one embodiment.

At 602, the discharge command goes high. At 604, the transistor T1 is off. At 606, IN+ goes high. This causes the output SW of the AND gate 144 to go high, closing the switch S1 and beginning the charging of the gate terminal of the transistor Q1. At 610, if the gate to source voltage VGS is less than Vmc, then the process returns to 608 and the gate terminal continues to charge. At 610, if the gate to source voltage Vgs is greater than Vmc, then the process proceeds to 612. At 612, the output SW of the AND gate 144 goes low, turning on the transistor T2 and discharging the gate voltage. At 614, the method 600 checks whether or not IN+ is low. If IN+ is not low, then the process returns to 612. If IN+ is still low, then the process proceeds to 616. At 616, the transistor T2 is turned off and discharge of the gate terminal stops. At 618, the method 600 checks whether IN+ has gone high (e.g., a rising edge of the driver signal 116 has been received). If IN+ is not high, then the process returns to 616. If IN+ has gone high, then the process proceeds to 606. The method 600 continues looping until the voltage on the DC link capacitor 108 has reached the low value VL.

Referring now to FIG. 7, at time t1 DisEn goes high (e.g., the discharge command has been received), IN+ is high, the transistor T1 turns off, SW goes high, VGS begins to charge, and the transistor T2 is off. At time t2, VGS reaches the threshold value Vmc, causing SW to go low and turning on the transistor T2, resulting in the discharge of VGS. At time t3, IN+ goes low, causing the transistor T2 to turn off. At time t4, IN+ goes high, causing SW to go high and beginning the charging of VGS. At t5, VGS has reached Vmc, causing SW to go low and turning on the transistor T2, discharging VGS. At time t6, IN+ goes low, causing the transistor T2 to turn off. The process of times t4-t6 repeats between times t7-t9. This process toggles the transistor Q1 on and off, intermittently causing a discharge current to flow until the voltage of the DC link capacitor 108 reaches the low voltage.

Figure 8:
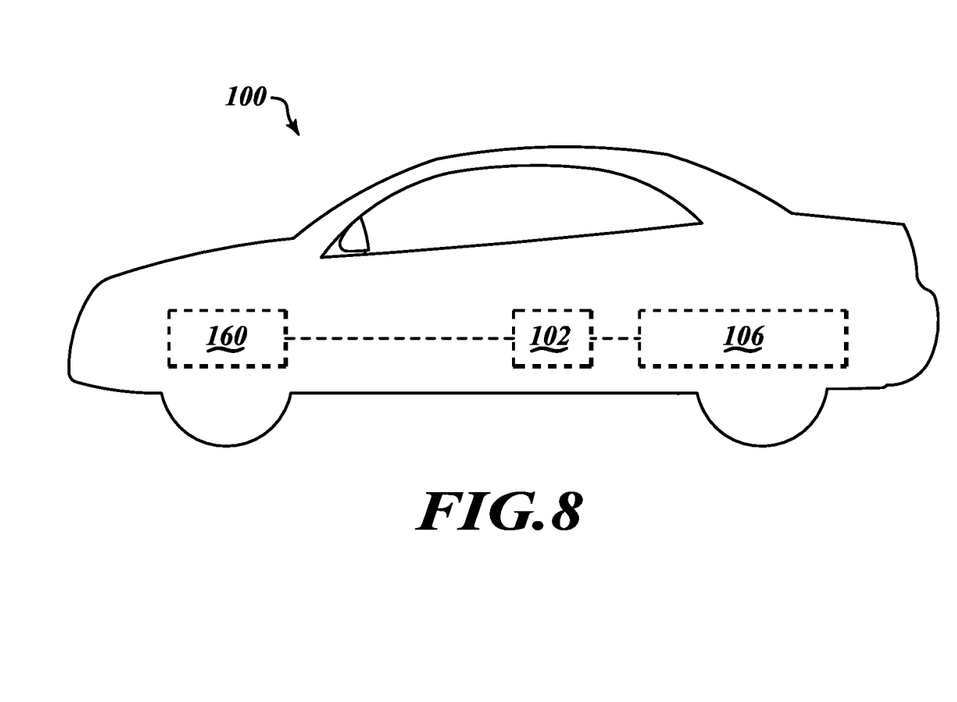
FIG. 8 is an illustration of an electronic vehicle including a traction inverter, in accordance with one embodiment.

FIG. 8 is an illustration of an electric vehicle 100, in accordance with one embodiment. The electric vehicle 100 includes attraction inverter 102, a battery 108, and the motor 160. The attraction inverter 102 can correspond to the traction inverters described in relation to FIGS. 1-7 and can perform the function of discharging the DC link capacitor 108. The attraction inverter 102 receives a DC voltage from a battery 106, generates an AC voltage, and provides the AC voltage to the motor 160.

Figure 9:
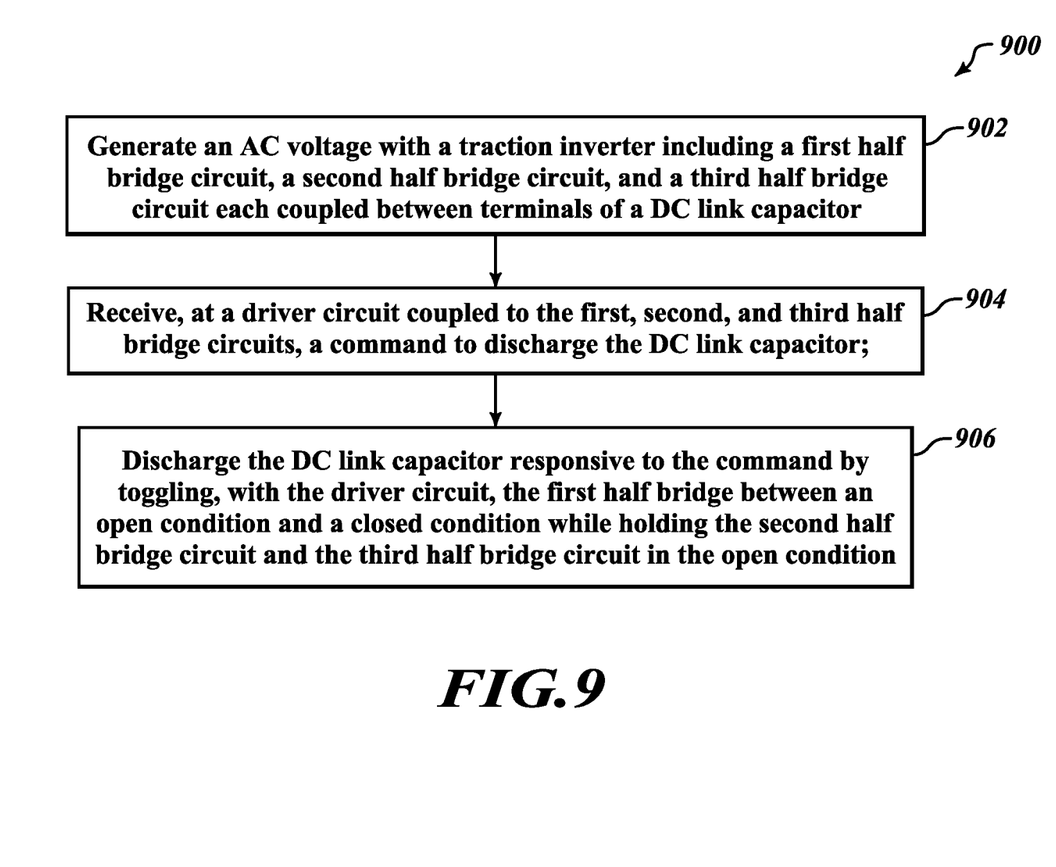
FIG. 9 is a flow diagram of a method for operating a traction inverter, in accordance with one embodiment.

FIG. 9 is a flow diagram of a method 900 for operating a traction inverter, in accordance with one embodiment. The method 900 can utilize systems, components, and processes described in relation to FIGS. 1-8. At 902, the method 900 includes generating an AC voltage with a traction inverter including a first half bridge circuit, a second half bridge circuit, and a third half bridge circuit each coupled between terminals of a DC link capacitor. At 904, the method 900 includes receiving, at a driver circuit coupled to the first, second, and third half bridge circuits, a command to discharge the DC link capacitor. At 906, the method 900 includes discharging the DC link capacitor responsive to the command by toggling, with the driver circuit, the first half bridge between an open condition and a closed condition while holding the second half bridge circuit and the third half bridge circuit in the open condition.

Figure 10:
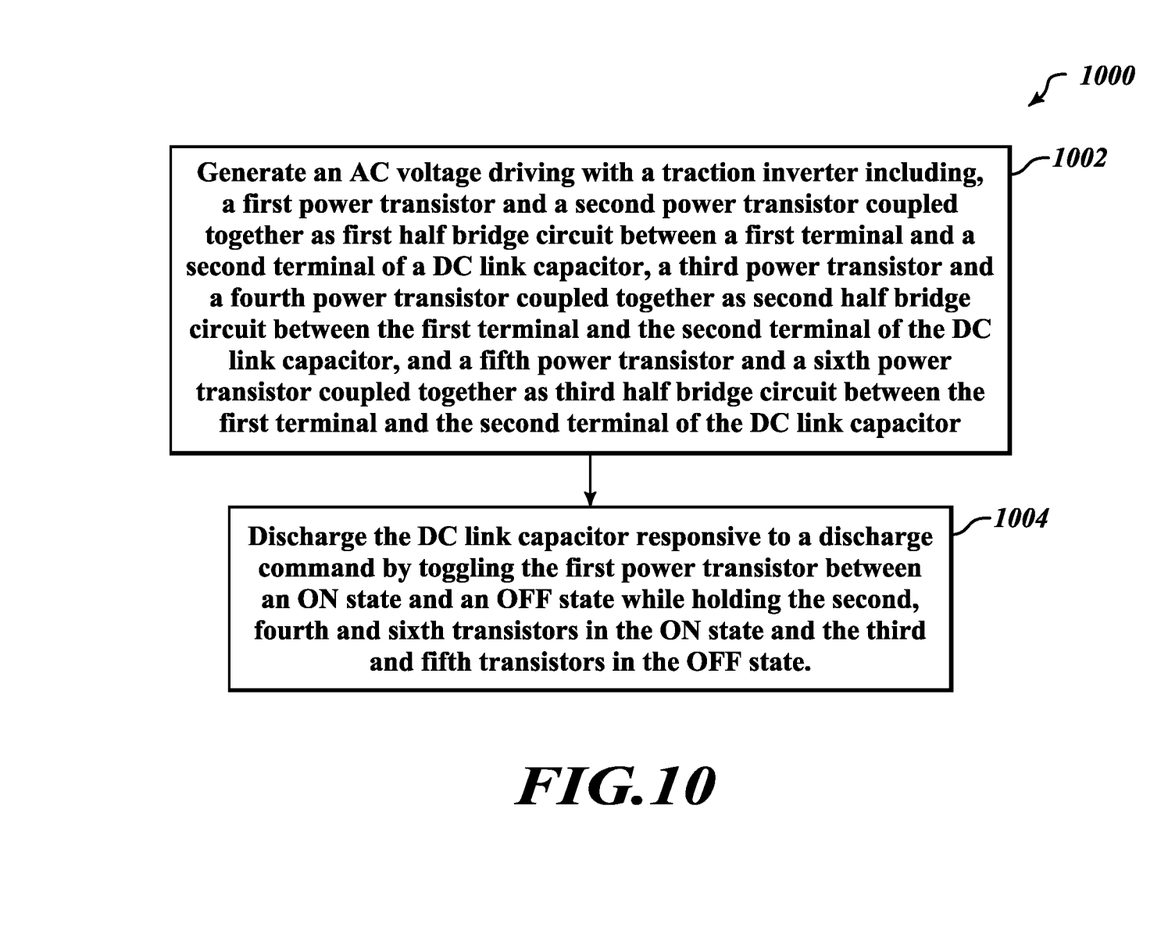
FIG. 10 is a flow diagram of a method for operating a traction inverter, in accordance with one embodiment.

FIG. 10 is a flow diagram of a method 1000 for operating a traction inverter, in accordance with one embodiment. The method 1000 can utilize systems, components, and processes described in relation to FIGS. 1-8. At 1002, the method 1000 includes generating an AC voltage with a traction inverter. The traction inverter includes a first power transistor and a second power transistor coupled together as first half bridge circuit between a first terminal and a second terminal of a DC link capacitor, a third power transistor and a fourth power transistor coupled together as second half bridge circuit between the first terminal and the second terminal of the DC link capacitor, and a fifth power transistor and a sixth power transistor coupled together as third half bridge circuit between the first terminal and the second terminal of the DC link capacitor. At 1004, the method 1000 includes discharging the DC link capacitor responsive to a discharge command by toggling the first power transistor between an on state and an off state while holding the second, fourth and sixth transistors in the on state and the third and fifth transistors in the off state.

In one embodiment, a method includes generating an AC voltage with a traction inverter including a first half bridge circuit, a second half bridge circuit, and a third half bridge circuit each coupled between terminals of a DC link capacitor. The method includes receiving, at a driver circuit coupled to the first, second, and third half bridge circuits, a command to discharge the DC link capacitor. The method includes discharging the DC link capacitor responsive to the command by toggling, with the driver circuit, the first half bridge between an open condition and a closed condition while holding the second half bridge circuit and the third half bridge circuit in the open condition.

In one embodiment, a method includes generating an AC voltage with a traction inverter. The traction inverter includes a first power transistor and a second power transistor coupled together as first half bridge circuit between a first terminal and a second terminal of a DC link capacitor, a third power transistor and a fourth power transistor coupled together as second half bridge circuit between the first terminal and the second terminal of the DC link capacitor, and a fifth power transistor and a sixth power transistor coupled together as a third half bridge circuit between the first terminal and the second terminal of the DC link capacitor. The method includes discharging the DC link capacitor responsive to a discharge command by toggling the first power transistor between an on state and an off state while holding the second, fourth and sixth transistors in the on state and the third and fifth transistors in the off state.

In one embodiment, a device includes a DC link capacitor and a traction inverter including a first half bridge circuit, a second half bridge circuit, and a third half bridge circuit each coupled between terminals of the DC link capacitor. The device includes a driver circuit coupled to the traction inverter. The driver circuit is configured to drive the first, second, and third half bridge circuits to generate an AC voltage and to discharge the DC link capacitor responsive to a discharge command by toggling the first half bridge between an open condition and a closed condition while holding the second half bridge circuit and the third half bridge circuit in the open condition.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   generating an AC voltage with a traction inverter including a first half bridge circuit, a second half bridge circuit, and a third half bridge circuit each coupled between terminals of a DC link capacitor;
   receiving, at a driver circuit coupled to the first, second, and third half bridge circuits, a command to discharge the DC link capacitor; and
   discharging the DC link capacitor responsive to the command by toggling, with the driver circuit, the first half bridge between an open condition and a closed condition while holding the second half bridge circuit and the third half bridge circuit in the open condition.

2. The method of claim 1, comprising driving a motor of an electric vehicle with the AC voltage.

3. The method of claim 1, wherein the first half bridge circuit includes a first transistor and a second transistor, the second half bridge circuit includes a third transistor and a fourth transistor, and the third half bridge circuit includes a fifth transistor and a sixth transistor.

4. The method of claim 3, wherein holding the second and third half bridge circuits in the open condition includes holding the third and fifth transistors in an off state and holding the fourth and sixth transistors in an on state.

5. The method of claim 4, wherein toggling the first half bridge circuit between the open condition and the closed condition includes holding the second transistor in the off state and toggling the first transistor between an on state and an off state.

6. The method of claim 5, comprising:
   comparing a voltage of the DC link capacitor to a low voltage threshold; and
   stopping the toggling of the first half bridge circuit if the voltage of the DC link capacitor is lower than the low voltage threshold.

7. The method of claim 5, wherein toggling the first transistor includes:
   charging a gate terminal of the first transistor responsive to a rising edge of a square wave driver signal;
   comparing a gate voltage of the first transistor to a threshold value greater than a threshold voltage of the first transistor;
   discharging the gate terminal of the first transistor responsive to the gate voltage reaching the threshold value; and
   resuming charging of the gate terminal of the first transistor responsive to a next rising edge of the square wave driver signal.

8. The method of claim 7, wherein a discharge current flows between the terminals of the DC link capacitor through the first half bridge circuit when the gate voltage is greater than the threshold voltage and less than the threshold value.

9. The method of claim 8, wherein the driver circuit includes a respective driver stage for each of the first, second, third, fourth, fifth, and sixth transistors.

10. The method of claim 1, comprising generating the command responsive to a collision of an electric vehicle that includes the traction inverter.

11. A method, comprising:
    generating an AC voltage with a traction inverter including:
      a first power transistor and a second power transistor coupled together as first half bridge circuit between a first terminal and a second terminal of a DC link capacitor;
      a third power transistor and a fourth power transistor coupled together as second half bridge circuit between the first terminal and the second terminal of the DC link capacitor; and
      a fifth power transistor and a sixth power transistor coupled together as third half bridge circuit between the first terminal and the second terminal of the DC link capacitor; and
    discharging the DC link capacitor responsive to a discharge command by toggling the first power transistor between an on state and an off state while holding the second, fourth and sixth transistors in the on state and the third and fifth transistors in the off state.

12. The method of claim 11, comprising:
    comparing a voltage of the DC link capacitor to a low voltage threshold; and
    stopping the toggling of the first half bridge circuit if the voltage of the DC link capacitor is lower than the low voltage threshold.

13. The method of claim 11, wherein toggling the first transistor includes:
    charging a gate terminal of the first transistor responsive to a rising edge of a square wave driver signal;
    comparing a gate voltage of the first transistor to a threshold value greater than a threshold voltage of the first transistor;
    discharging the gate terminal of the first transistor responsive to the gate voltage reaching the threshold value; and
    resuming charging of the gate terminal of the first transistor responsive to a next rising edge of the square wave driver signal.

14. The method of claim 13, wherein a discharge current flows between the first and second terminals of the DC link capacitor through the first half bridge circuit when the gate voltage is greater than the threshold voltage and less than the threshold value.

15. The method of claim 14, wherein a driver circuit includes a respective driver stage for each of the first, second, third, fourth, fifth, and sixth transistors.

16. The method of claim 11, comprising generating the command responsive to a collision of an electric vehicle that includes the traction inverter.

17. A device, comprising:
 a DC link capacitor;
 a traction inverter including a first half bridge circuit, a second half bridge circuit, and a third half bridge circuit each coupled between terminals of the DC link capacitor; and
 a driver circuit coupled to the traction inverter and configured to:
  drive the first, second, and third half bridge circuits to generate an AC voltage; and
  discharge the DC link capacitor responsive to a discharge command by toggling the first half bridge between an open condition and a closed condition while holding the second half bridge circuit and the third half bridge circuit in the open condition.

18. The device of claim 17, comprising a controller coupled to the driver circuit and configured to provide the discharge command to the driver circuit.

19. The device of claim 17, comprising a motor coupled to the traction inverter, wherein the traction inverter is configured to supply the AC voltage to the traction inverter.

20. The device of claim 19, wherein the first half bridge circuit includes a first transistor and a second transistor, the second half bridge circuit includes a third transistor and a fourth transistor, and the third half bridge circuit includes a fifth transistor and a sixth transistor, wherein holding the second and third half bridge circuits in the open condition includes holding the third and fifth transistors in an off state and holding the fourth and sixth transistors in an on state, wherein toggling the first half bridge circuit between the open condition and the closed condition includes holding the second transistor in the off state and toggling the first transistor between an on state and the off state.

\* \* \* \* \*